US011977150B2

(12) United States Patent
Di et al.

(10) Patent No.: US 11,977,150 B2
(45) Date of Patent: May 7, 2024

(54) VEHICLE LOCALIZATION PRECISION ENHANCEMENT VIA MULTI-SENSOR FUSION

(71) Applicant: Black Sesame International Holding Limited, Santa Clara, CA (US)

(72) Inventors: Ruihui Di, Castro Valley, CA (US); Yu Huang, Sunnyvale, CA (US); Jizhang Shan, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 286 days.

(21) Appl. No.: 17/193,908

(22) Filed: Mar. 5, 2021

(65) Prior Publication Data
US 2022/0283298 A1 Sep. 8, 2022

(51) Int. Cl.
*G01S 13/931* (2020.01)
*G06F 18/2113* (2023.01)
*G06V 20/56* (2022.01)

(52) U.S. Cl.
CPC ........ *G01S 13/931* (2013.01); *G06F 18/2113* (2023.01); *G06V 20/56* (2022.01); *G01S 2013/932* (2020.01); *G01S 2013/9327* (2020.01)

(58) Field of Classification Search
CPC ...... G01S 13/931; G01S 19/00; G01S 19/485; G01S 19/49; G01S 19/52; G01S 2013/932; G01S 2013/9327; G01S 5/163; G06F 18/2113; G06V 20/56
See application file for complete search history.

(56) References Cited

U.S. PATENT DOCUMENTS

| 10,832,418 | B1* | 11/2020 | Karasev | G06V 10/42 |
| 2018/0188032 | A1* | 7/2018 | Ramanandan | G01S 19/52 |
| 2019/0206084 | A1* | 7/2019 | Noble | G06T 7/74 |
| 2020/0272148 | A1* | 8/2020 | Karasev | G06V 10/803 |
| 2021/0208283 | A1* | 7/2021 | Zhao | G01S 17/89 |
| 2021/0319584 | A1* | 10/2021 | Qian | G06V 20/588 |
| 2022/0187843 | A1* | 6/2022 | Wang | G01C 21/20 |
| 2022/0205788 | A1* | 6/2022 | Ramirez Llanos | G06V 20/56 |

OTHER PUBLICATIONS

J K Suhr et al., "Sensor Fusion Based Low-Cost Vehicle Localization System for Complex Urban Environment", IEEE T-ITS, May 2017.
J Jeong, Y Cho, A Kim, "Road SLAM: Road Marking based SLAM with Lane-level Accuracy", IEEE IV, Jun. 2017.
F Li et al., "Lane-level map-matching with integrity on high-definition maps", IEEE IV, Jun. 2017.

* cited by examiner

*Primary Examiner* — Timothy X Pham
(74) *Attorney, Agent, or Firm* — Timothy T. Wang; Ni, Wang & Massand, PLLC

(57) ABSTRACT

A method of determining a vehicle position and a vehicle velocity, including receiving a camera image sequence based on a camera borne by a vehicle and determining a camera pose based on the camera image sequence. The method includes determining a global position system location based on a global position system receiver borne by the vehicle, determining an inertial movement signal based on an inertial movement unit borne by the vehicle and receiving a wheel encoder signal from a wheel of the vehicle. The method additionally includes determining at least one of the vehicle positions and the vehicle velocity based on at least two of the camera pose, the global position system location, the inertial movement signal and the wheel encoder signal in temporal synchronization.

17 Claims, 14 Drawing Sheets

VEHICLE LOCALIZATION PRECISION ENHANCEMENT VIA MULTI-SENSOR FUSION

BACKGROUND

Technical Field

The instant disclosure is related to autonomous vehicle localization more specifically to vehicle localization precision enhancement via multi-sensor fusion.

Background

Currently, global positioning systems (GPS)/inertial measurement units (IMU) are relied upon for vehicle localization. The utilization of GPS/IMU for vehicle positioning may be affected in environments in which GPS signals are reduced or are absent such as in tunnels, underground garages, and the like.

SUMMARY

An example method of determining a vehicle position and a vehicle velocity, including receiving a camera image sequence based on a camera borne by a vehicle and determining a camera pose based on the camera image sequence. The method includes determining a global position system location based on a global position system receiver borne by the vehicle, determining an inertial movement signal based on an inertial movement unit borne by the vehicle and receiving a wheel encoder signal from a wheel of the vehicle. The method additionally includes determining at least one of the vehicle position and the vehicle velocity based on at least two of the camera pose, the global position system location, the inertial movement signal and the wheel encoder signal in temporal synchronization.

Another example method of determining a vehicle position and a vehicle velocity, including receiving a camera image sequence based on a camera borne by a vehicle and determining a camera pose based on the camera image sequence. The method includes determining a global position system location based on a global position system receiver borne by the vehicle and determining an inertial movement signal based on an inertial movement unit borne by the vehicle. The method also includes receiving a wheel encoder signal from a wheel of the vehicle and initializing the vehicle position and the vehicle velocity based on a fusion of the camera pose, the global position system location, the inertial movement signal and the wheel encoder signal.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
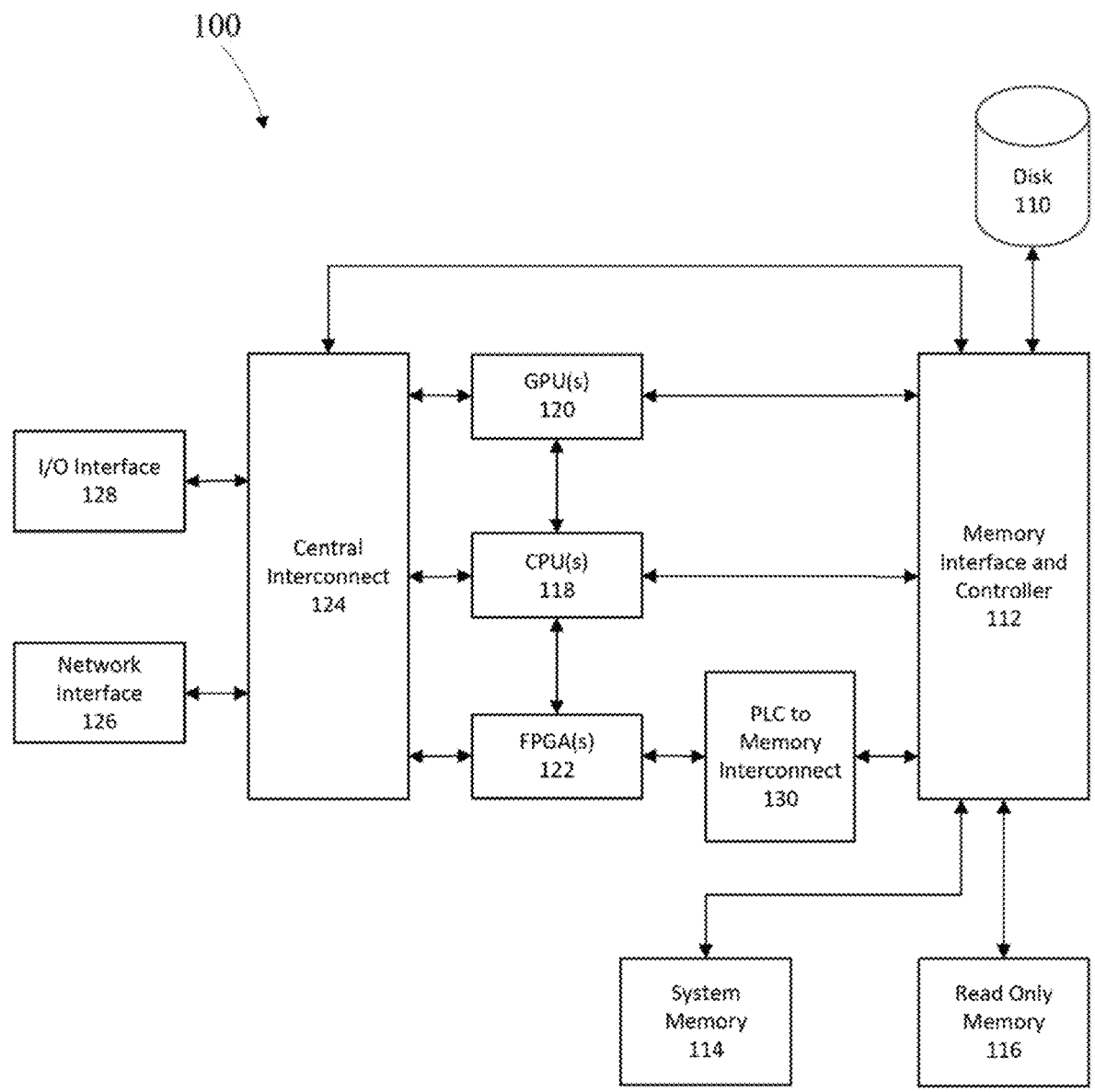
FIG. 1 is a first example system diagram in accordance with one embodiment of the disclosure.
Figure 13:
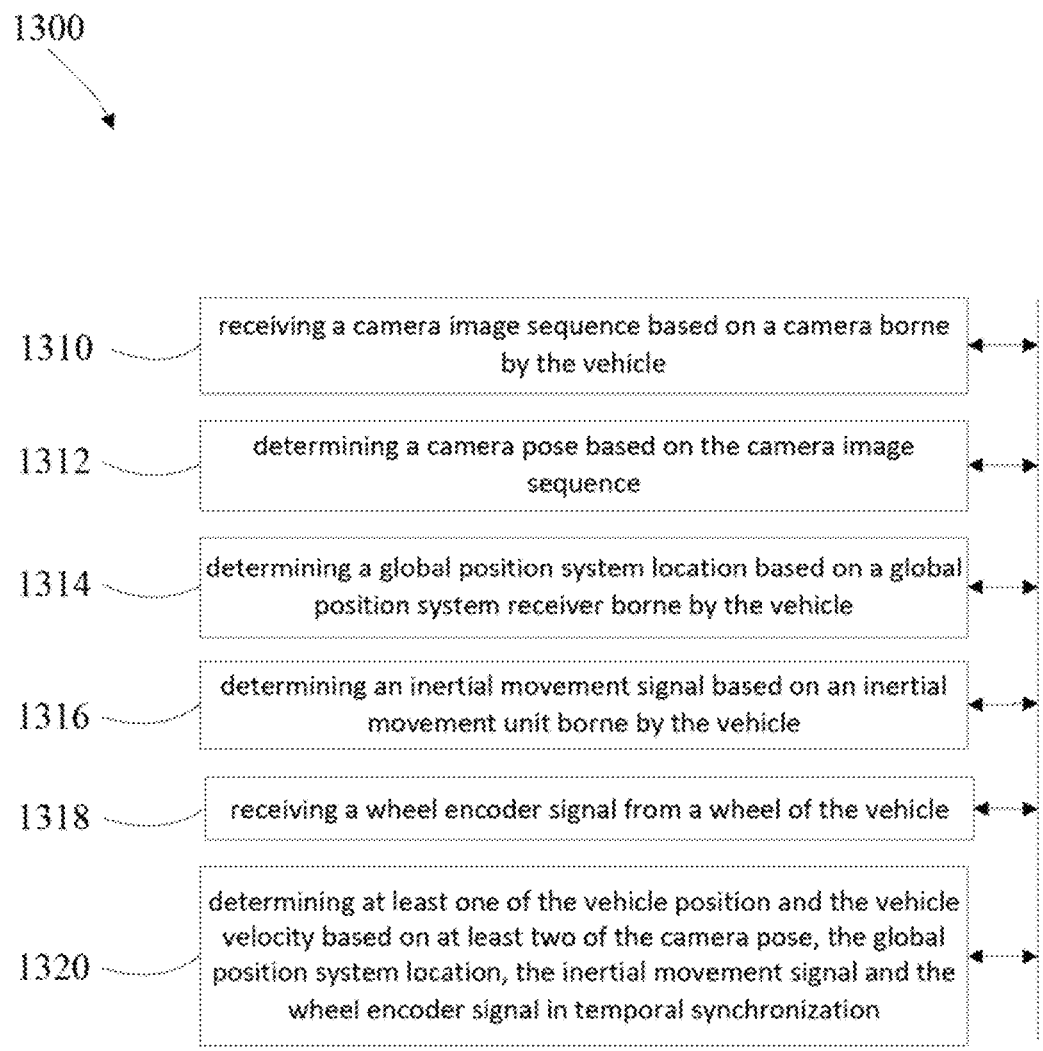
FIG. 13 is a first example method in accordance with one embodiment of the disclosure.
Figure 14:
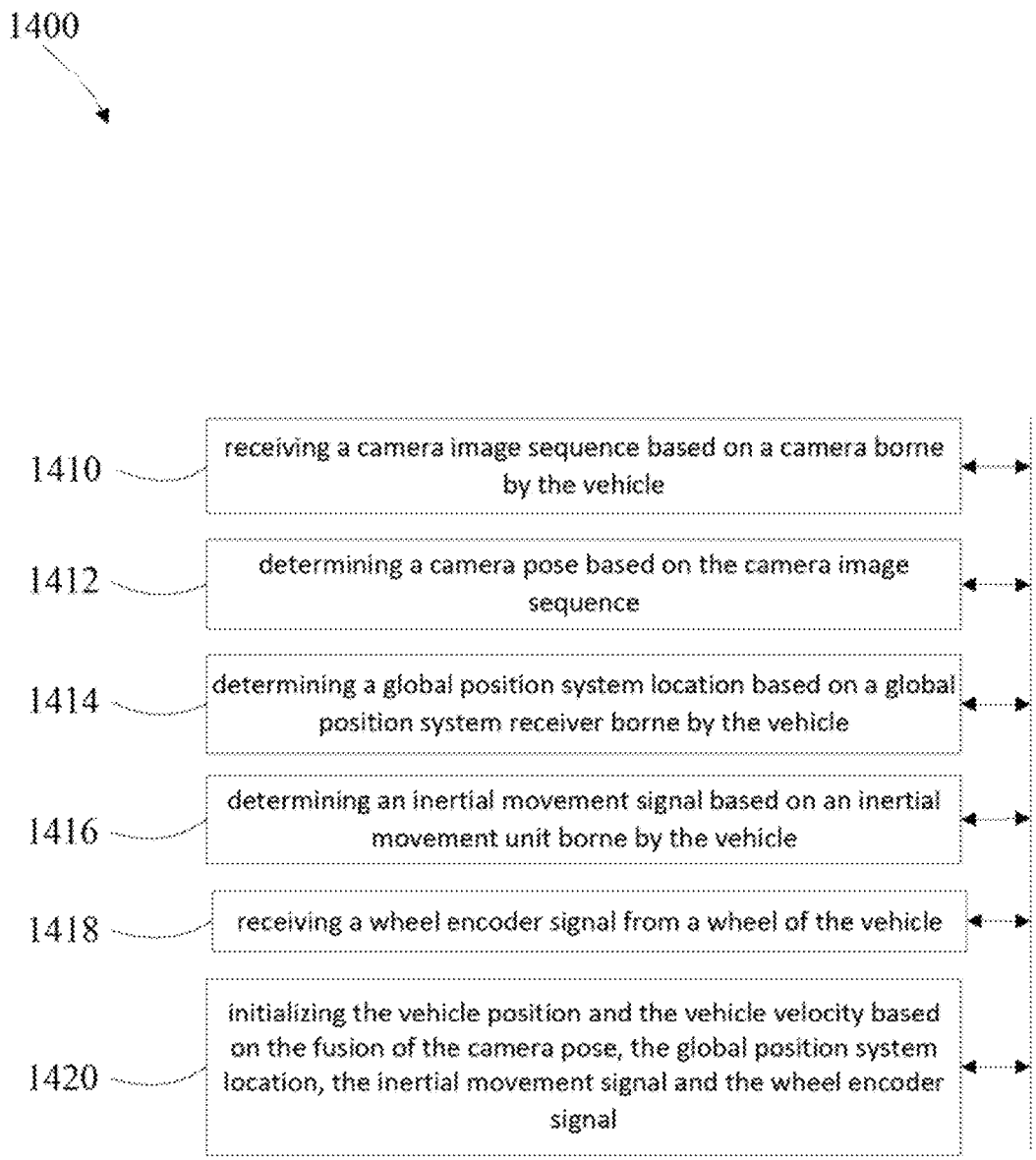
FIG. 14 is a second example method in accordance with one embodiment of the disclosure.

FIG. 1 depicts an example hybrid computational system 100 that may be used to implement neural nets associated with the operation of one or more portions or steps of the processes depicted in FIGS. 13-14. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
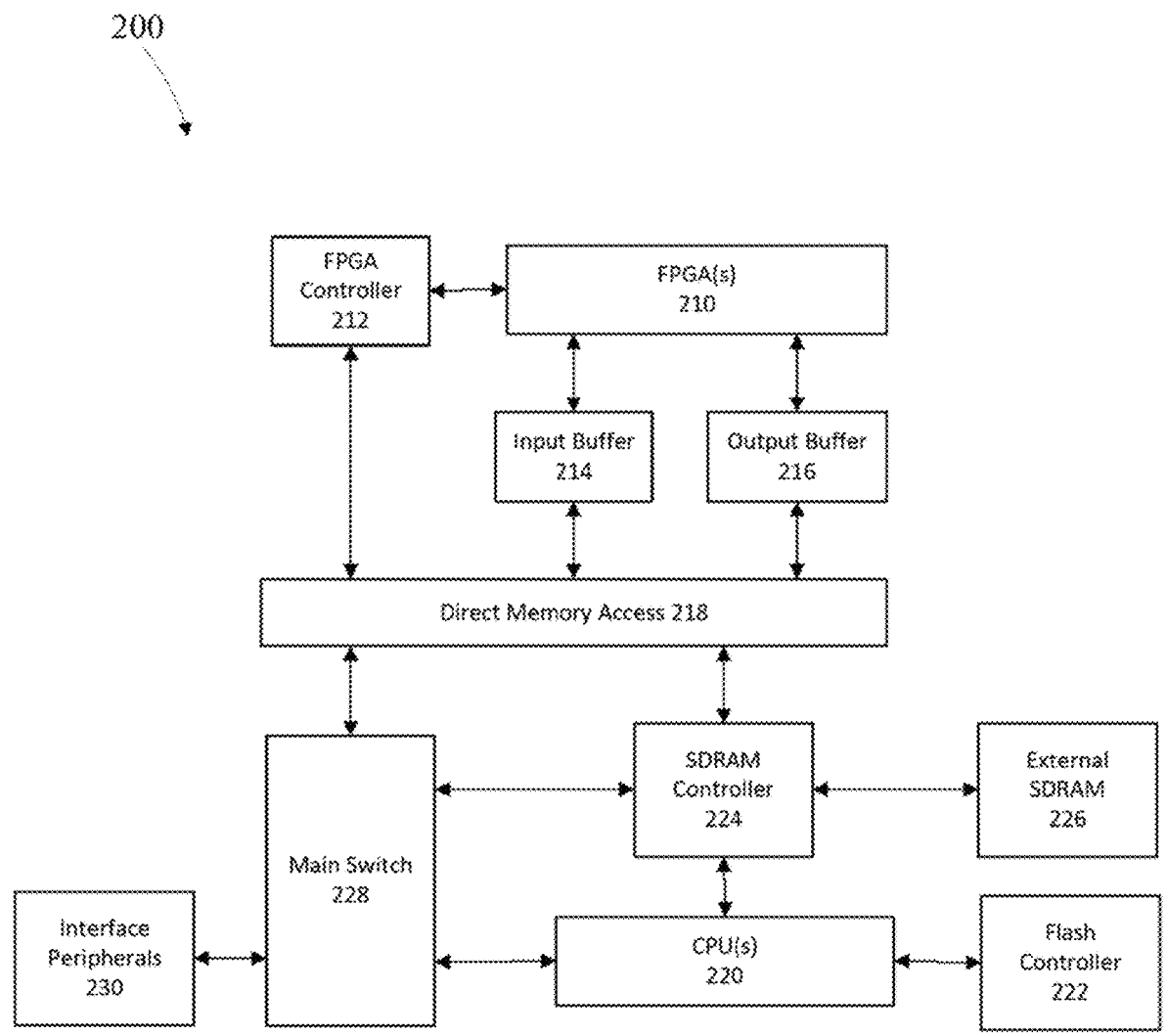
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the S DRAM controller is also connected to external SDRAM 226 and the CPU 220. The main switch 228 is connected to the peripherals interface 230. A flash controller 222 controls persistent memory and is connected to the CPU 220.

The proposed vehicle location solution utilizes multiple sensors, such as global positioning system (GPS), inertial measurement unit (IMU), camera based visual odometry (VO), wheel encoder based wheel odometry (WO), and the like to provide localization for autonomous vehicles.

Figure 3:
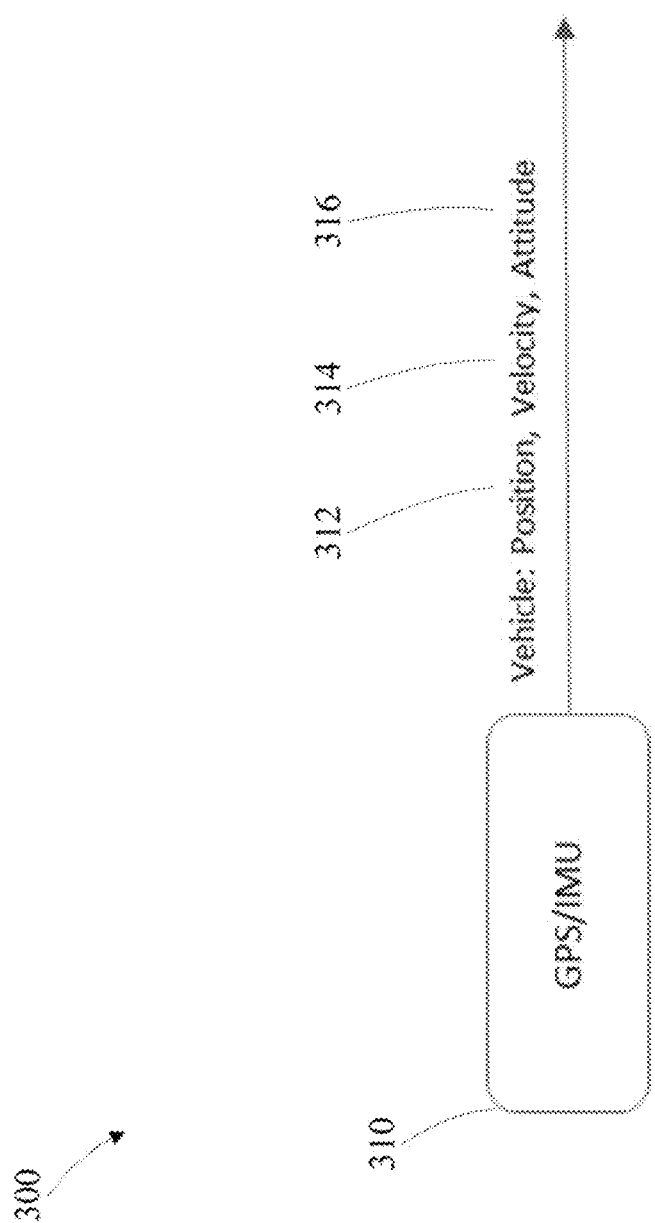
FIG. 3 is an example of global navigation satellite system/inertial measurement unit receiver outputs in accordance with one embodiment of the disclosure.

FIG. 3 depicts an example set of global position system (GPS) and or global navigation satellite system (GNSS) and inertial measurement unit (IMU) receiver outputs 300. GPS/GNSS are a satellite based set of transmitters that transmit the satellites position, orbit and the exact time. This transmitted data is utilized to determine the ground position of a target based on differential timing of signal receipt. GPS relies upon access to GPS satellite or GPS ground based signals. Utilizing a GPS and IMU 310 it is possible to determine a position 312, a velocity 314 and an attitude 316 of the receiver. The IMU utilizes internal sensors such as accelerometers, gyros, magnetometers and barometers to continue to locate a vehicle when GPS signals are lost. A major disadvantage of IMUs is that they suffer from accumulated error and are ineffective for use in navigation.

Figure 4:
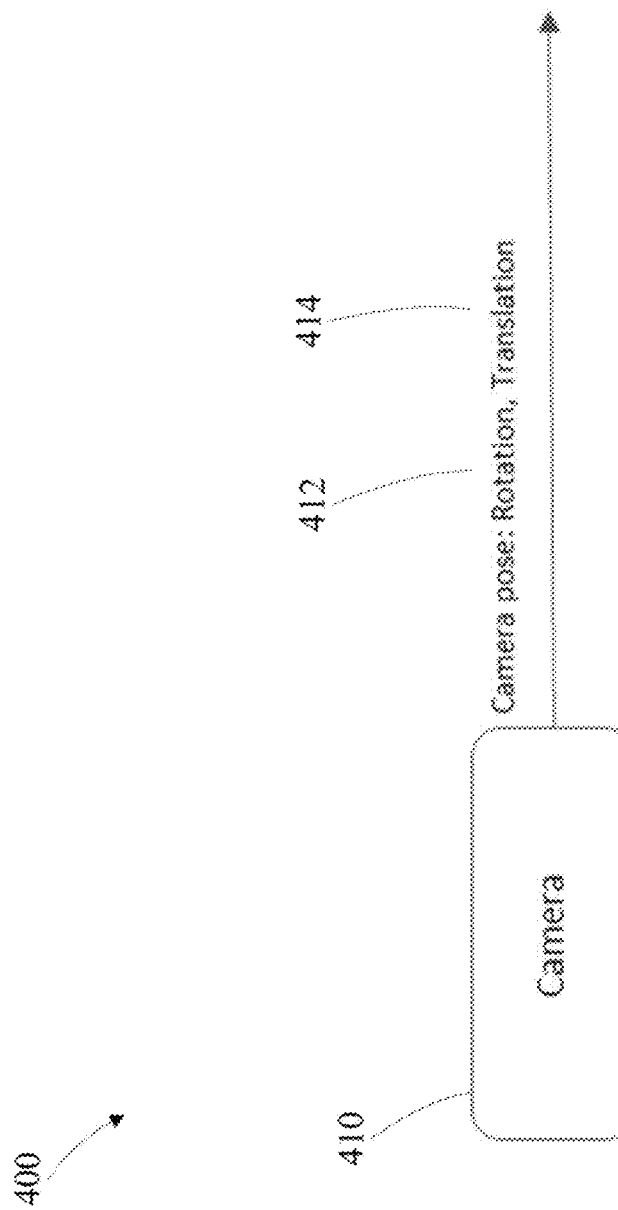
FIG. 4 is an example of visual odometer outputs in accordance with one embodiment of the disclosure.

FIG. 4 depicts an example of camera based visual odometer outputs 400. Visual odometry (VO) allows a position and orientation of the camera to be determined from images obtained from the camera. Visual odometry from the camera 410 outputs allow determination of a camera pose in rotation 412 and translation 414 to be determined. Visual odometry estimates the motion of a camera in real-time utilizing image sequences. One disadvantage of a visual odometry only system that that motion scale is unobservable.

Figure 5:
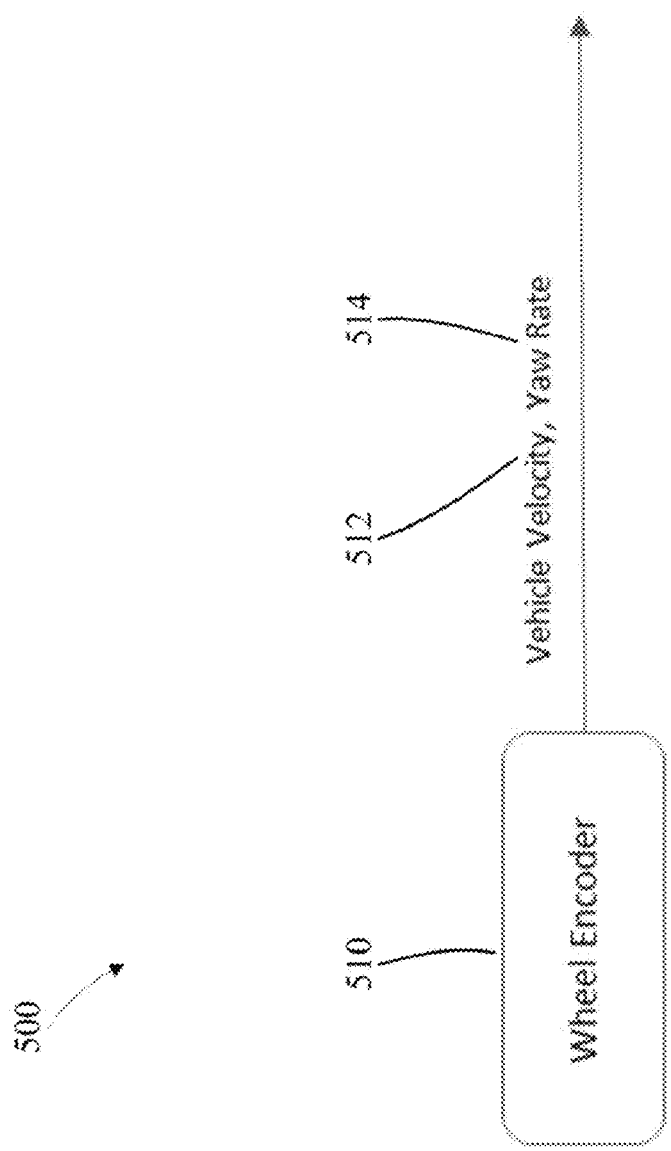
FIG. 5 is an example of wheel encoder outputs in accordance with one embodiment of the disclosure.

FIG. 5 depicts an example 500 of wheel encoder based wheel odometry (WO). A wheel encoder 510 allows wheel odometry to estimate a vehicle linear velocity 512 and yaw rate 514 based on wheel encoder measurements. The wheel encoder measures the arc traveled by the wheel and utilizing the wheel radius a distance traveled in time, i.e. vehicle velocity may be determined. A disadvantage of a WO only system is that only the distance traveled, velocity and yaw rate may be determined.

A fusion based vehicle localization solution may be composed of sensors, such as global positioning system (GPS), inertial measurement unit (IMU), wheel encoder based wheel odometry (WO), camera based visual odometry (VO) and the like. The proposed solution combines sensors to overcome the disadvantages of each individual type of sensor for use in autonomous vehicles.

In situations in which global positioning system (GPS) signals are blocked or become very weak, the inertial measurement unit integrated receiver may output positioning information through dead reckoning; however, this may induce accumulated errors. One possible solution is to utilize camera based visual odometry and wheel encoder based wheel odometry to complement the inertial measurement unit receiver and reduce IMU accumulated error. In those cases in which multiple sensors may not be functioning, such as GPS and camera based odometry in a very dark parking garage, the inertial measurement unit receiver may receive the wheel odometry outputs to allow for autonomous navigation to continue.

The proposed method combines sensors, such as global positioning system, inertial measurement unit, camera based visual odometry, wheel encoder based wheel odometry, to provide positioning results for autonomous vehicles via a Kalman filter. Due to the fusion of the sensors, if data is not available for multiple types of sensors, the method allows for continued autonomous navigation. This sensor-fusion allows continued navigation function in challenging environments for autonomous vehicle localization, such as tunnels, city cannons, underground garages, and the like. In the event that the global positioning system signal is blocked, the wheel encoder calibrated visual odometry may output allows position detection through dead reckoning. In the event that the global positioning system and the camera based visual odometry are both offline, the wheel encoder may output positioning results to the IMU in the interim.

Figure 6:
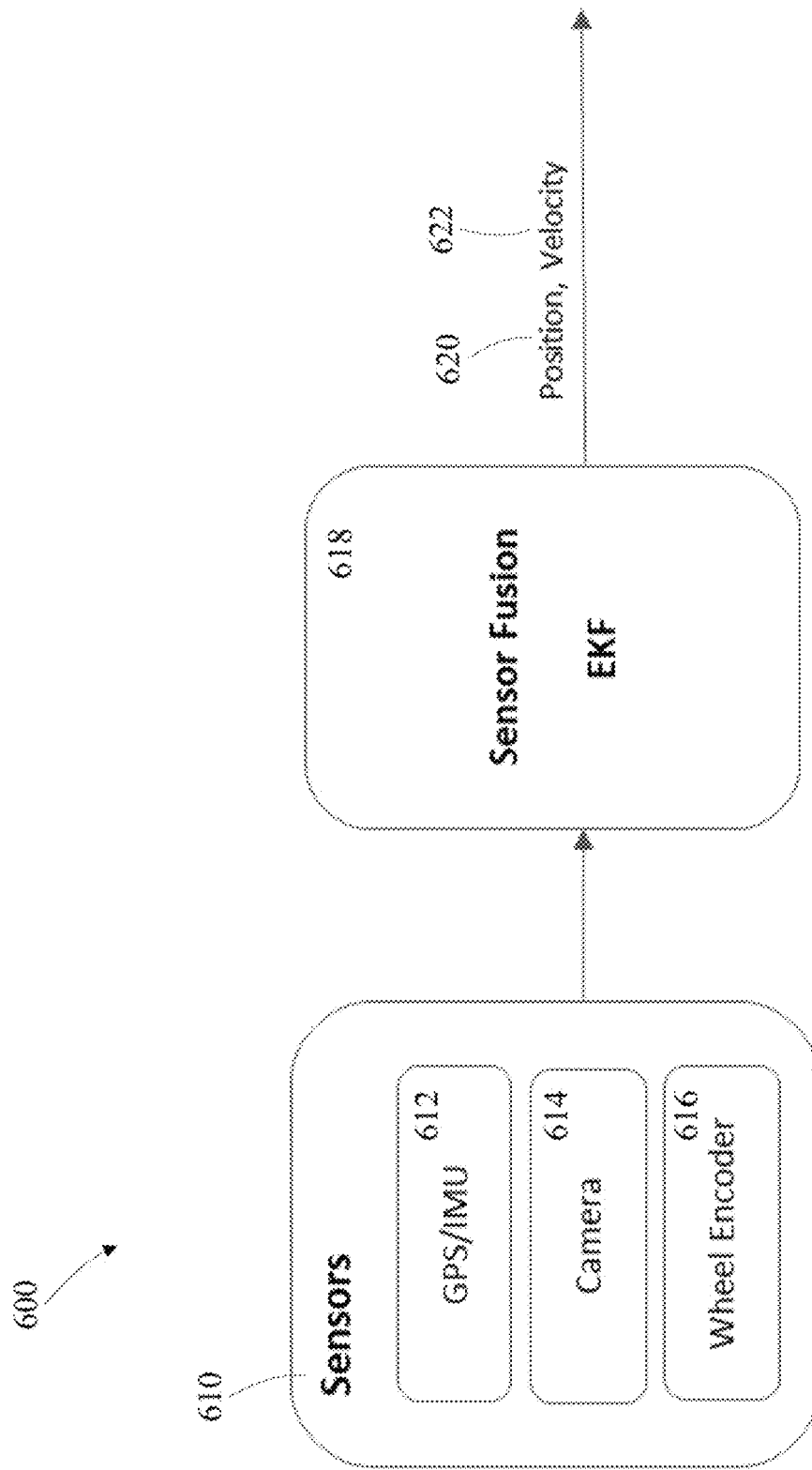
FIG. 6 is an example method of sensor fusion for autonomous vehicle localization in accordance with one embodiment of the disclosure.

FIG. 6 depicts an example system of sensor fusion for autonomous vehicle localization 600. The system includes sensors 610 such as a GPS/IMU 612, a camera 614 to allow output of visual odometry and a wheel encoder 616 to allow output of wheel odometry. The sensor signals are sent to a sensor fusion module 618 utilizing an extended Kaman filter (EKF) to determine vehicle position 620 and velocity 622.

A global positioning system and inertial measurement unit integrated receiver may provide initial reference positioning results for camera based visual odometry initialization. The camera based visual odometry scale drift may be calibrated through GPS/IMU distance measurement.

Figure 7:
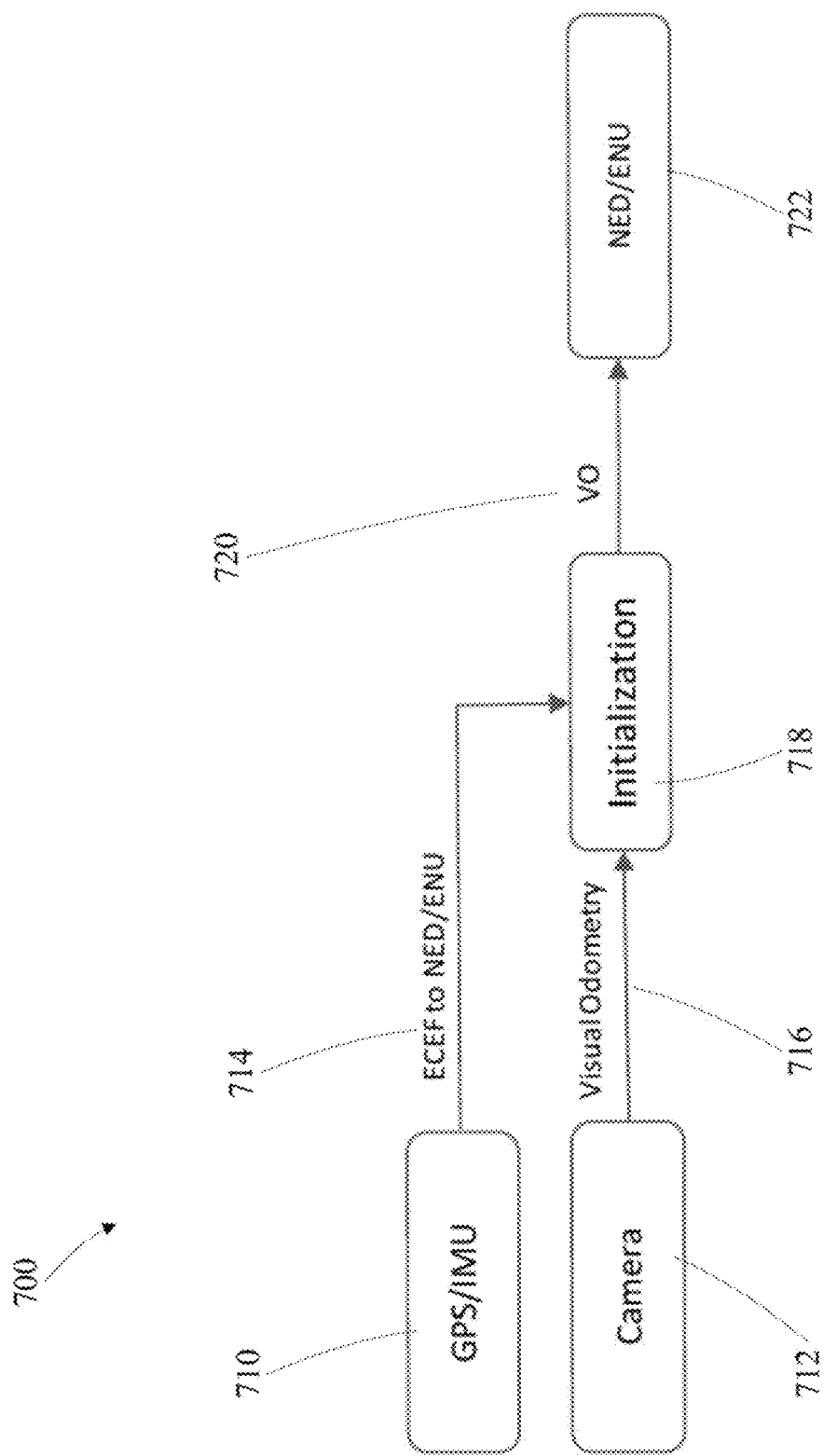
FIG. 7 is an example of visual odometry initialization in accordance with one embodiment of the disclosure.

FIG. 7 depicts an example of visual odometry initialization 700. Position and velocity data are output by the GPS/IMU 710 and the earth-centered earth-fixed coordinates are transformed 714 to a set of east north up coordinates and or a set of north east down coordinates. The camera 712 output a camera image sequence that is used as the basis for visual odometry 716. An initialization process 718 occurs based on the input of the transformed GPS/IMU coordinates for the visual odometry. The output visual odometry 720 is transformed into a set of east north up coordinates and or a set of north east down coordinates 722.

A global positioning system and inertial measurement unit integrated receiver may provide initial reference positioning results for wheel encoder based wheel odometry initialization. The wheel encoder based wheel encoder extrinsic parameter may be calibrated through GPS/IMU distance measurement.

Figure 8:
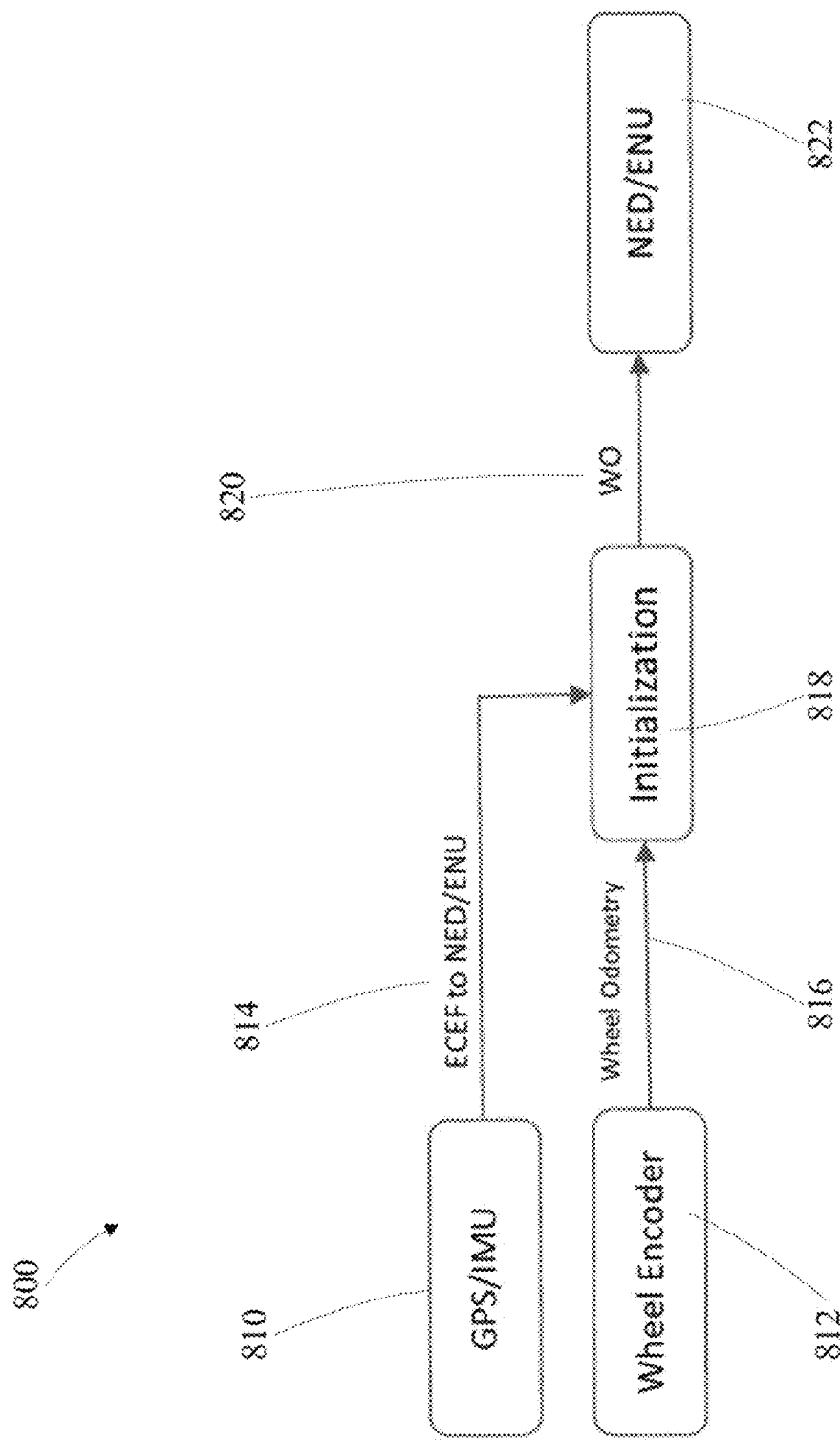
FIG. 8 is an example of wheel encoder initialization in accordance with one embodiment of the disclosure.

FIG. 8 depicts an example of wheel encoder initialization 800. Position and velocity data are output by the GPS/IMU 810 and the earth-centered earth-fixed coordinates are transformed 814 to a set of east north up coordinates and or a set of north east down coordinates. A wheel encoder 812 outputs data that is used as the basis for wheel odometry 816. An initialization process 818 occurs based on the input of the transformed GPS/IMU coordinates and the wheel odometry 816. The wheel encoder extrinsic parameter may be determined during the initialization process. The output wheel odometry 820 is transformed into a set of east north up coordinates and or a set of north east down coordinates 822.

A standalone camera based visual odometry may not be able to accurately identify a vehicle position when used for autonomous driving car due to accumulated scale drift error that may affect the visual odometry results. A wheel encoder based wheel odometry may allow calibration of the visual odometry scale to zero out scale drift through the determination of a wheel encoder extrinsic parameter.

Figure 9:
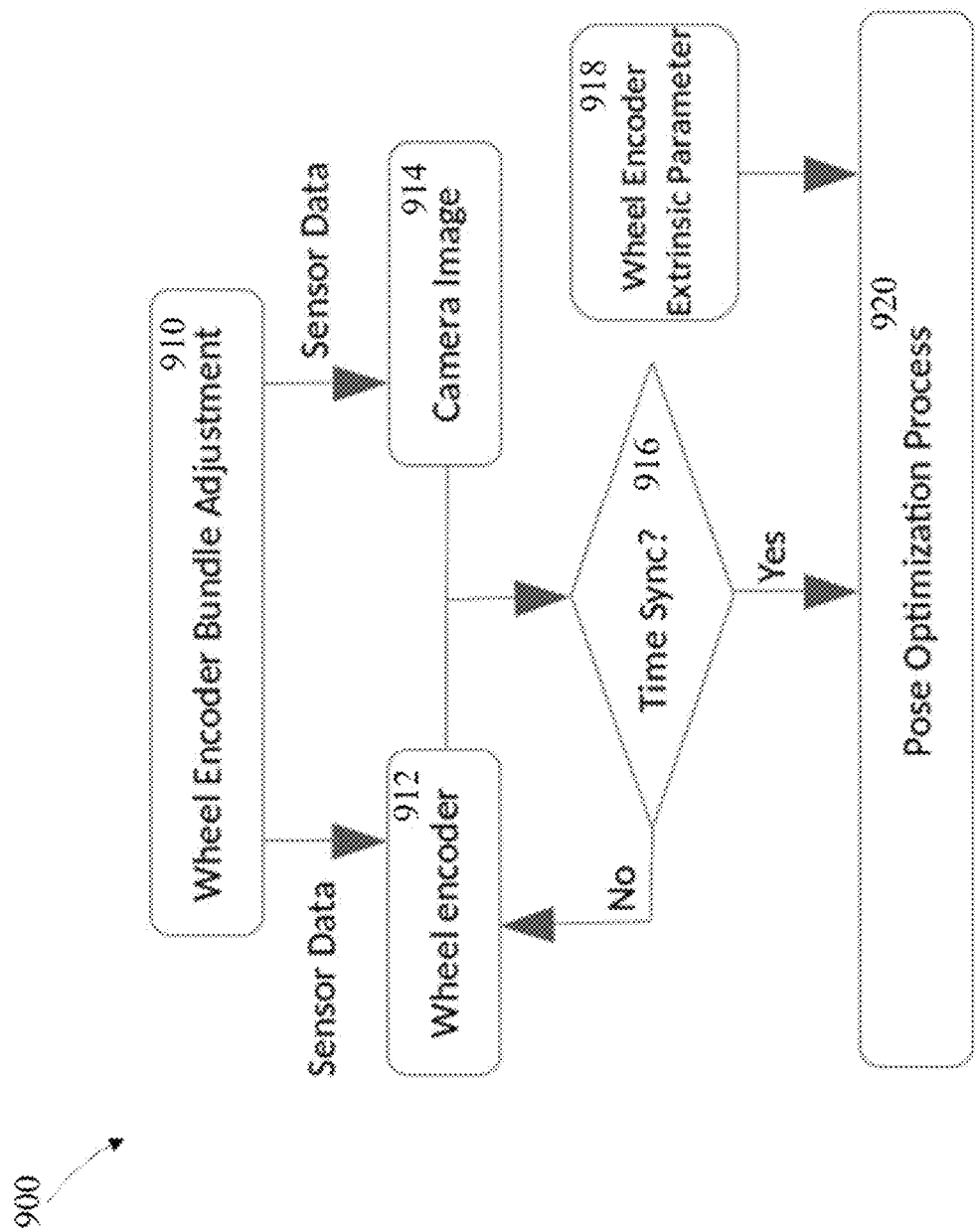
FIG. 9 is an example method of bundle adjustment for a camera and a wheel encoder in accordance with one embodiment of the disclosure.

FIG. 9 depicts an example method 900 of bundle adjustment 910 for a camera and a wheel encoder. The camera pose is based on the camera image 614 sequence from the camera to output visual odometry. The wheel encoder 912 outputs a wheel odometry. The wheel encoder 912 may provide a distance measurement between two adjacent camera image 914 epochs. Time synchronization 916 allows a pose optimization 920 to be determined. The wheel encoder extrinsic parameter 918 links a visual odometry scale to global coordinates based on the wheel encoder and camera calibration process. The camera sensor may provide image data sequences and the wheel encoder measurement may be used to constrain the camera pose in a local bundle adjustment.

A global positioning system and inertial measurement unit integrated receiver may provide pose optimization results for camera based visual odometry. The camera based visual odometry scale drift may be calibrated through GPS/IMU distance measurement.

Figure 10:
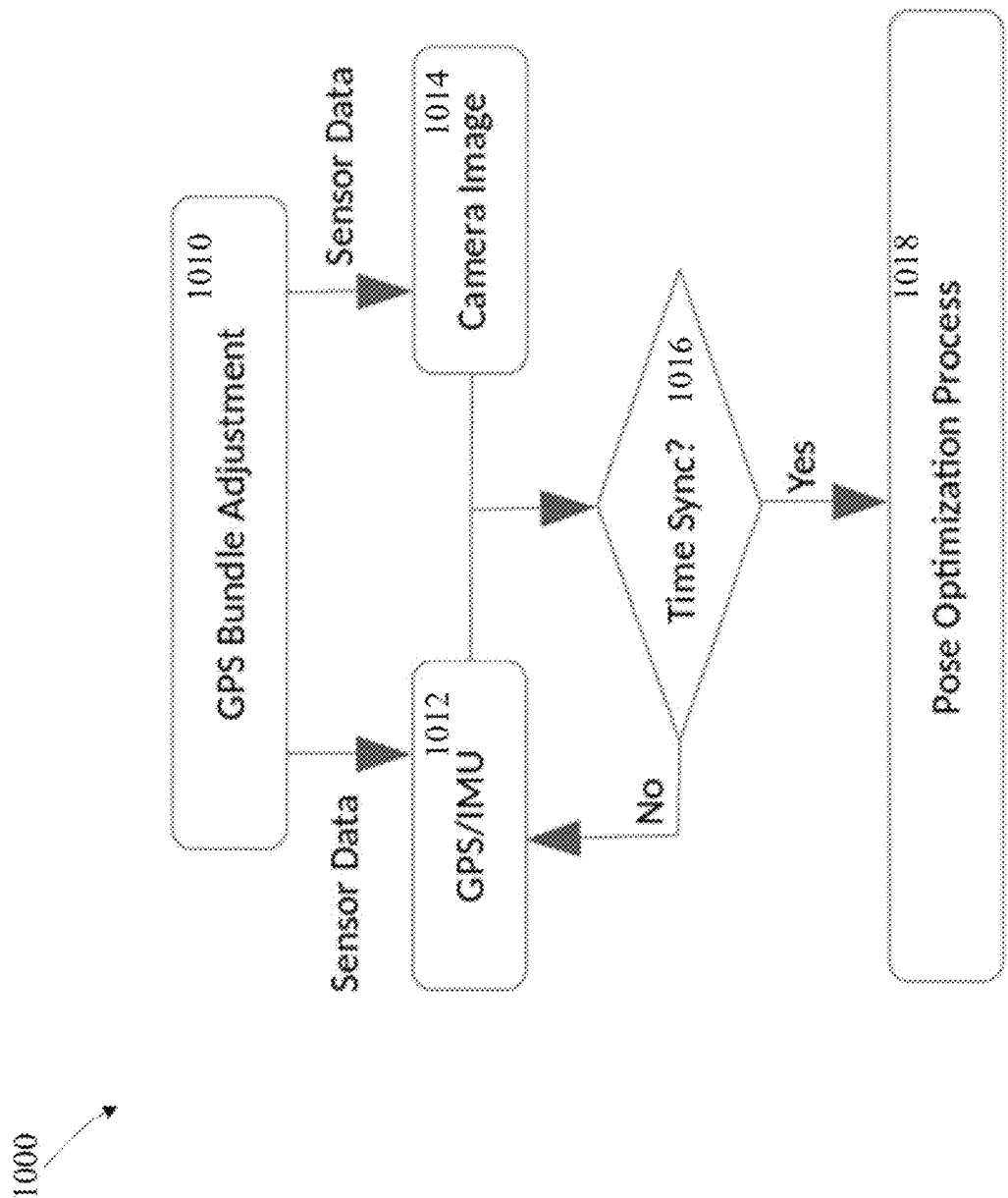
FIG. 10 is an example method of bundle adjustment for a camera and a global positioning system/inertial measurement unit receiver in accordance with one embodiment of the disclosure.

FIG. 10 depicts an example method 1000 of bundle adjustment 1010 for a camera image 1014 and global positioning system and inertial measurement unit receiver data 1012. Time synchronization 1016 allows camera pose optimization 1018 to be determined. The global positioning system inertial measurement unit receiver may provide accurate position information which may be used to constrain the camera pose in local bundle adjustment.

Time synchronized sensor datasets may be processed by the visual odometry system in a simultaneous or near simultaneous fashion during initialization. The camera image may perform the visual odometry initialization process prior to the GPS/IMU initialization or the wheel encoder based wheel odometry. The global positioning system and inertial measurement unit receiver may provide global position information for the visual odometry system. The camera pose outputted by the visual odometry may be synchronized with the global positioning system position information. The camera pose may be converted to a global positioning system global coordinate based on simultaneous localization and the mapping global coordinates after the visual odometry initialization process. The wheel encoder measurements may be determined between two initialized camera image epochs and may be initialized in synchrony with the global positioning system global coordinates. Thus, the wheel encoder may output global positioning information independently when the global positioning system, inertial measurement unit receiver and camera have interrupted data streams.

Figure 11:
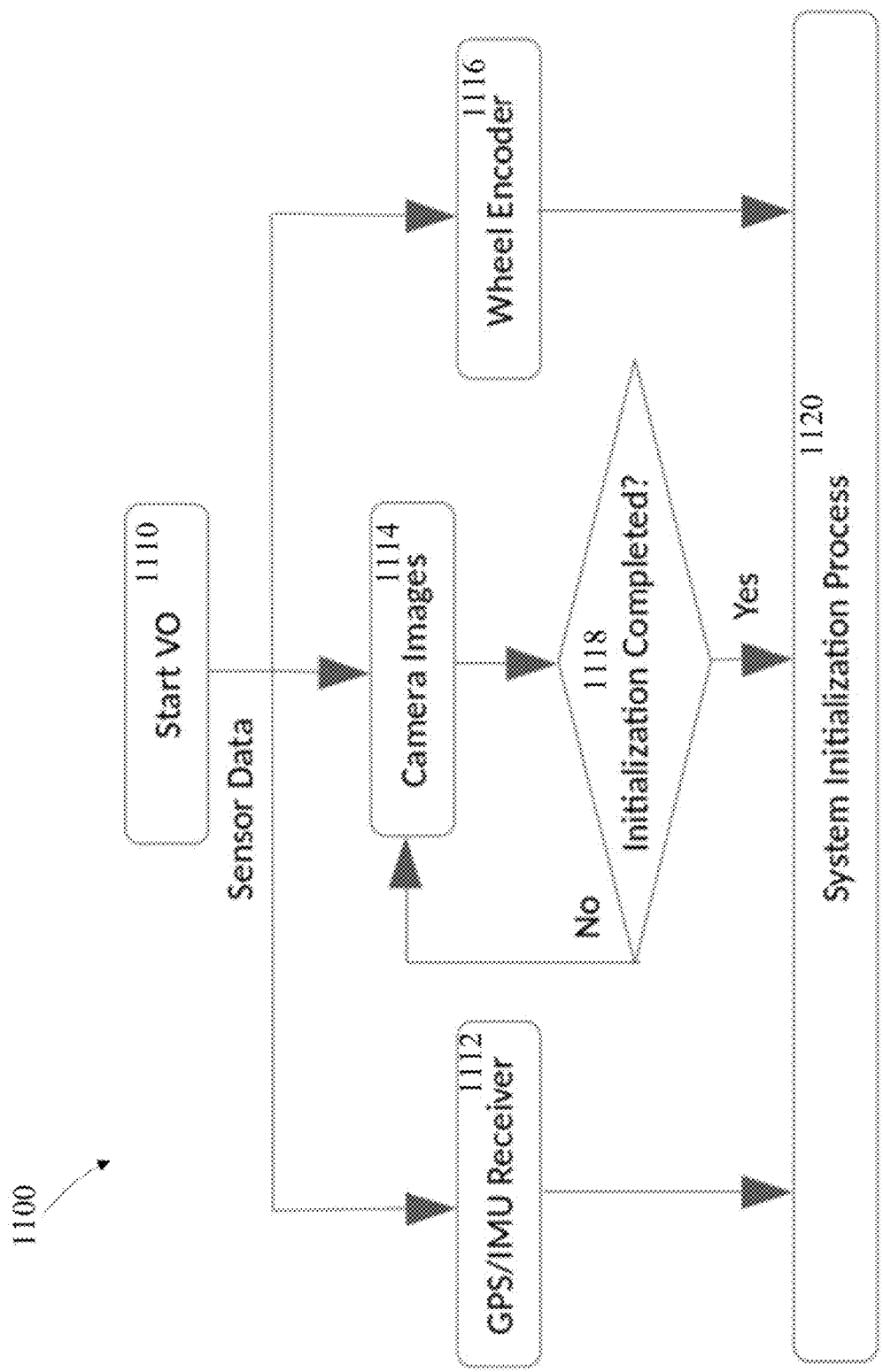
FIG. 11 is an example of visual odometry initialization in a system having a global positioning system/inertial measurement unit receiver, a camera and a wheel encoder in accordance with one embodiment of the disclosure.

FIG. 11 depicts an example method 1100 of visual odometry initialization 1110. The system initialization process may be based on global positioning system and inertial measurement unit receiver data 1112, a camera based visual odometry that utilizes camera image sequences 1114 and wheel odometry that utilizes data from wheel encoder 1116. In this method visual odometry initialization 1118 is completed prior to system initialization 1120. The system initialization receives GPS/IMU data, visual odometry data and wheel odometry data and utilizes the three data sets to initialize the system.

Time synchronized sensor datasets may be processed by the visual odometry system in a simultaneous or near simultaneous fashion during navigation. The global positioning system and inertial measurement unit receiver and the wheel encoder based wheel odometry may provide global position information for the visual odometry system. The camera pose outputted by the visual odometry may be synchronized with the global positioning system position information. The camera pose may be converted to a global positioning system global coordinate based on simultaneous localization and the mapping global coordinates after the visual odometry initialization process. The wheel encoder measurements may be determined between two initialized camera image epochs and may output position results in synchrony with the global positioning system global coordinates. Thus, the wheel encoder may output global positioning information independently when the global positioning system, inertial measurement unit receiver and camera have interrupted data streams.

Figure 12:
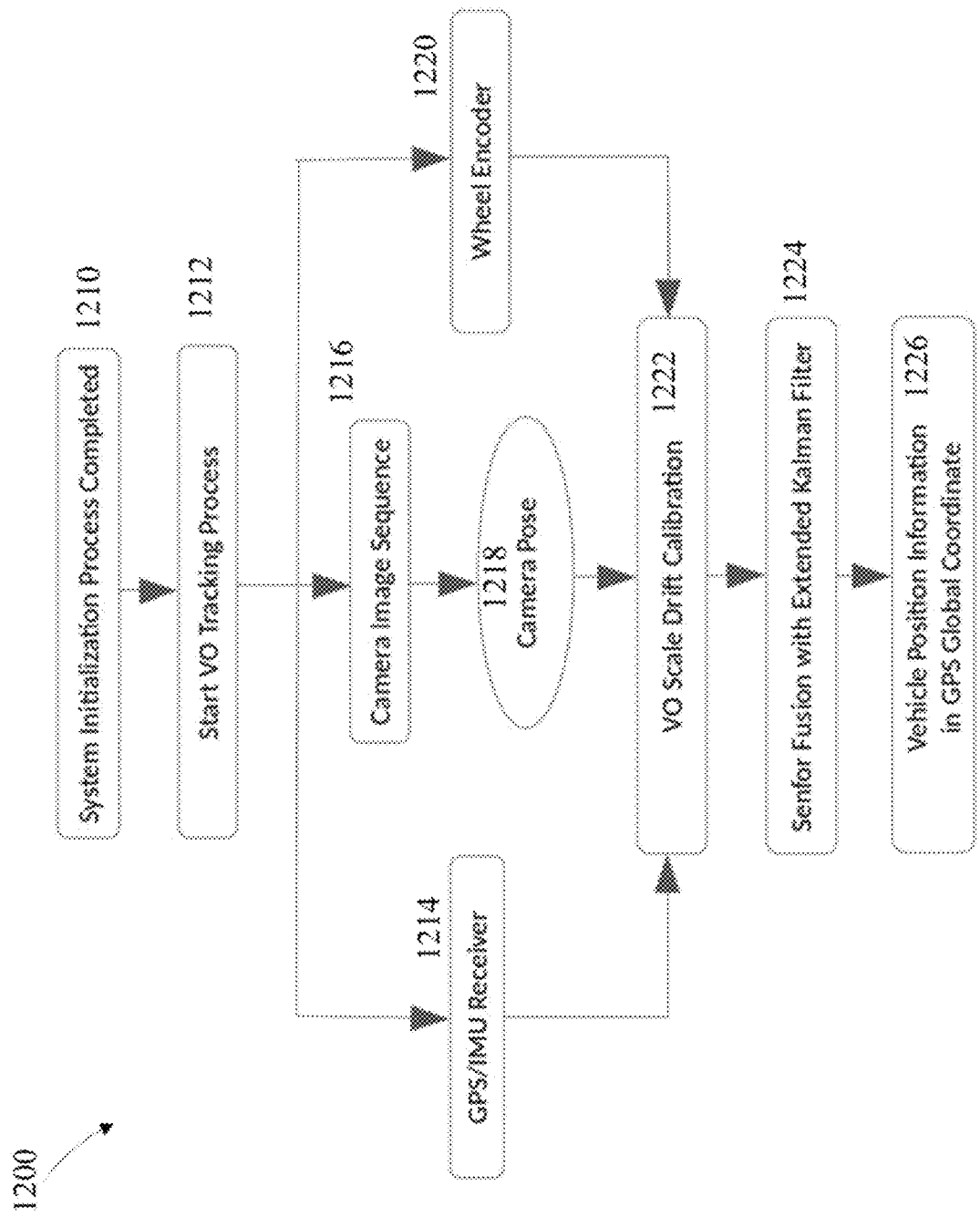
FIG. 12 is an example method of signal processing for a global positioning system/inertial measurement unit receiver, a camera, a visual odometer and a wheel encoder in accordance with one embodiment of the disclosure.

FIG. 12 depicts an example method 1200 of signal processing for a global positioning system and inertial measurement unit receiver, a camera, a visual odometer and a wheel encoder. After system initialization FIG. 11, 1100, is completed FIG. 11, 1120, FIG. 12 1210 visual odometry tracking may begin 1212. In this example method, the camera image sequence 1216 is utilized to determine an initial camera pose 1218 based on visual odometry. Data from the GPS/IMU receiver 1214 and wheel odometry based on wheel encoder data 1220 are routed to a visual odometry drift calibration module 1222. The data from the GPS/IMU, the visual odometry data and the wheel odometry data are fused 1224 and undergo extended Kaman filtering. The wheel encoder calibrated visual odometry outputs and global positioning system and inertial measurement unit receiver outputs may be processed together through a Kalman filter for sensor fusion. The data from the extended Kaman filter is utilized to determine vehicle position information in GPS global coordinates 1226.

The camera pose between two adjacent camera image sequences may be determined by simultaneous or near-simultaneous localization and mapping. The wheel encoder measurements between two adjacent camera image sequences may be used to help calibrate the visual odometry scale. The global positioning system and inertial measurement unit receiver may provide positioning information which may be used to calibrate the visual odometry scale in global coordinates.

In situations in which no GPS data is received, the wheel encoder based wheel odometry may be used to initialize the visual odometry scale in global coordinate. The wheel encoder may be utilized to calibrate the visual odometry scale in global coordinates since it has already been initialized with global positioning system in global coordinate during the system initialization process. Utilizing wheel encoder based wheel odometry measurements in the visual odometry tracking loop, the visual odometry scale may be made more accurate than visual odometry alone due to scale drift errors.

If the global positioning system/inertial measurement unit receiver and camera have data interruptions, the wheel encoder based wheel odometry may assist the visual odometry tracking loop to output positioning information. When the visual odometry system recovers from tracking loss, the previous wheel encoder's pose may be utilized to initialize the visual odometry system. When global positioning system/inertial measurement unit receiver has data recovery, a bundle adjustment may be made to the system.

An example method of determining a vehicle position includes receiving 1310 a camera image sequence based on a camera borne by a vehicle and determining 1312 a camera pose based on the camera image sequence. The method includes determining 1314 a global position system location based on a global position system receiver borne by the vehicle, determining 1316 an inertial movement signal based on an inertial movement unit borne by the vehicle and receiving 1318 a wheel encoder signal from a wheel of the vehicle. The method additionally includes determining 1320 at least one of the vehicle position and the vehicle velocity based on at least two of the camera pose, the global position system location, the inertial movement signal and the wheel encoder signal in temporal synchronization.

The method may also include correcting the camera pose based on at least one of the global position system location, the inertial movement signal and the wheel encoder signal filtering and or extended Kalman filtering of at least one of the vehicle position and the vehicle velocity. The method may also include converting at least one of at least one of the vehicle position and the vehicle velocity to the global position system location and or converting a set of global position system earth-centered earth-fixed coordinates to a set of east north up coordinates and or converting a set of global position system earth-centered earth-fixed coordinates to a set of north east down coordinates. The method may further include correcting the camera pose based on a wheel encoder extrinsic parameter. The method may also include initializing at least one of the vehicle position and the vehicle velocity based on a fusion of the camera pose, the global position system location, the inertial movement signal and the wheel encoder signal.

Another example method of determining a vehicle position, includes receiving 1410 a camera image sequence based on a camera borne by a vehicle and determining 1412 a camera pose based on the camera image sequence. The method includes determining 1414 a global position system location based on a global position system receiver borne by the vehicle and determining 1416 an inertial movement signal based on an inertial movement unit borne by the vehicle. The method also includes receiving 1418 a wheel encoder signal from a wheel of the vehicle and initializing 1420 the vehicle position and the vehicle velocity based on a fusion of the camera pose, the global position system location, the inertial movement signal and the wheel encoder signal.

The method may also include correcting the camera pose based on at least one of the global position system location, the inertial movement signal and the wheel encoder signal filtering and or extended Kalman filtering of at least one of the vehicle position and the vehicle velocity. The method may also include converting at least one of at least one of the vehicle position and the vehicle velocity to the global position system location and or converting a set of global position system earth-centered earth-fixed coordinates to a set of east north up coordinates and or converting a set of global position system earth-centered earth-fixed coordinates to a set of north east down coordinates. The method may further include correcting the camera pose based on a wheel encoder extrinsic parameter.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of determining a vehicle position, comprising:
   receiving a camera image sequence from a camera borne by a vehicle;
   determining a camera pose to determine the position and orientation of the camera on the vehicle based on the camera image sequence;
   determining a global position system location from a global position system receiver borne by the vehicle;
   determining an inertial movement signal based on an inertial movement unit borne by the vehicle;
   receiving a wheel encoder signal from a wheel of the vehicle; and
   determining at least one of the vehicle position and a vehicle velocity based on a fusion of at least one category with a least one different category, the categories selected from the group consisting of the camera pose, the global position system location, the inertial movement signal, and the wheel encoder signal in temporal synchronization.

2. The method of claim 1 further comprising correcting the camera pose based on at least one of the global position system location, the inertial movement signal, and the wheel encoder signal.

3. The method of claim 1 further comprising filtering of at least one of the vehicle position and the vehicle velocity.

4. The method of claim 1 further comprising extended Kalman filtering of at least one of the vehicle position and the vehicle velocity.

5. The method of claim 1 further comprising converting at least one of at least one of the vehicle position and the vehicle velocity to the global position system location.

6. The method of claim 1 further comprising converting a set of global position system earth-centered earth-fixed coordinates to a set of east north up coordinates.

7. The method of claim 1 further comprising converting a set of global position system earth-centered earth-fixed coordinates to a set of north east down coordinates.

8. The method of claim 1 further comprising initializing at least one of the vehicle position and the vehicle velocity based on the fusion at least one category with a least one different category, the categories selected from the group consisting of the camera pose, the global position system location, the inertial movement signal, and the wheel encoder signal.

9. The method of claim 1 further comprising correcting the camera pose based on a wheel encoder extrinsic parameter.

10. A method of determining a vehicle position, comprising:
    receiving a camera image sequence from a camera borne by a vehicle;

determining a camera pose to determine the position and orientation of the camera on the vehicle based on the camera image sequence;

determining a global position system location from a global position system receiver borne by the vehicle;

determining an inertial movement signal based on an inertial movement unit borne by the vehicle;

receiving a wheel encoder signal from a wheel of the vehicle; and initializing the vehicle position and a vehicle velocity based on a fusion of at least one category with a least one different category, the categories selected from the group consisting of the camera pose, the global position system location, the inertial movement signal, and the wheel encoder signal.

11. The method of claim 10 further comprising correcting the camera pose based on at least one of the global position system location, the inertial movement signal, and the wheel encoder signal.

12. The method of claim 10 further comprising filtering of at least one of the vehicle position and the vehicle velocity.

13. The method of claim 10 further comprising extended Kalman filtering of at least one of the vehicle position and the vehicle velocity.

14. The method of claim 10 further comprising converting at least one of at least one of the
vehicle position and the vehicle velocity to the global position system location.

15. The method of claim 10 further comprising converting a set of global position system earth-centered earth-fixed coordinates to a set of east north up coordinates.

16. The method of claim 10 further comprising converting a set of global position system earth-centered earth-fixed coordinates to a set of north east down coordinates.

17. The method of claim 10 further comprising correcting the camera pose based on a wheel encoder extrinsic parameter.

* * * * *